US012581287B2

(12) United States Patent
Chenumolu

(10) Patent No.: US 12,581,287 B2
(45) Date of Patent: Mar. 17, 2026

(54) SYSTEMS AND METHODS FOR A VISUAL CHRONOLOGICAL RECORD OF A NETWORK

(71) Applicant: Boost SubscriberCo L.L.C., Englewood, CO (US)

(72) Inventor: Siddhartha Chenumolu, Broadlands, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 247 days.

(21) Appl. No.: 18/225,514

(22) Filed: Jul. 24, 2023

(65) Prior Publication Data

US 2024/0373211 A1      Nov. 7, 2024

Related U.S. Application Data

(60) Provisional application No. 63/463,798, filed on May 3, 2023.

(51) Int. Cl.
H04W 8/30      (2009.01)
H04W 24/04      (2009.01)
(52) U.S. Cl.
CPC ............. H04W 8/30 (2013.01); H04W 24/04 (2013.01)
(58) Field of Classification Search
CPC ................................ H04W 8/30; H04W 24/04
See application file for complete search history.

(56) References Cited

U.S. PATENT DOCUMENTS

| | | | | |
|---|---|---|---|---|
| 9,483,343 | B2 * | 11/2016 | Lvin | ................... H04L 41/0636 |
| 2019/0165988 | A1 * | 5/2019 | Wang | ................... H04L 41/065 |
| 2020/0220782 | A1 * | 7/2020 | Parangattil | ............. H04L 41/22 |
| 2020/0285547 | A1 * | 9/2020 | Shukla | ................... G06N 20/00 |
| 2020/0365185 | A1 * | 11/2020 | Vittal | ................... G11B 27/102 |
| 2020/0382378 | A1 * | 12/2020 | Arur | ....................... H04L 41/06 |
| 2023/0069434 | A1 * | 3/2023 | Cheng | ................... H04L 41/142 |
| 2023/0198860 | A1 * | 6/2023 | Bothwell | ............... H04L 43/10 |
| | | | | 709/224 |
| 2023/0327952 | A1 * | 10/2023 | Reehil, III | .......... H04L 41/0856 |

* cited by examiner

*Primary Examiner* — Michael Thier
(74) *Attorney, Agent, or Firm* — Jeremiah J. Baunach; Frontier IP Law PLLC

(57)                    ABSTRACT

Embodiments are directed a system that monitors a plurality of relevant network conditions of a wireless cellular network. Over time, the system records a plurality of network snapshots based on the monitoring. Each network snapshot reflects a status of each applicable network condition at a respective point in time at which the snapshot was recorded. The system then generates a respective visual network topology map for each network snapshot through which the status of each network characteristic at the point time at which the snapshot was recorded is accessible. The system connects together each network snapshot resulting in a visual chronological historical record of the status of the network at each point time at which the snapshot was recorded reflected by each respective network topology map.

15 Claims, 11 Drawing Sheets

500

Connect together each network snapshot
502

Receive an alarm indicating an issue with the network
504

Search the chronological historical record of the status of the network to pinpoint a change in a network condition that started a cascade of events that caused the alarm
506

Pinpoint the change in the network condition that started the cascade of events that caused the alarm
508

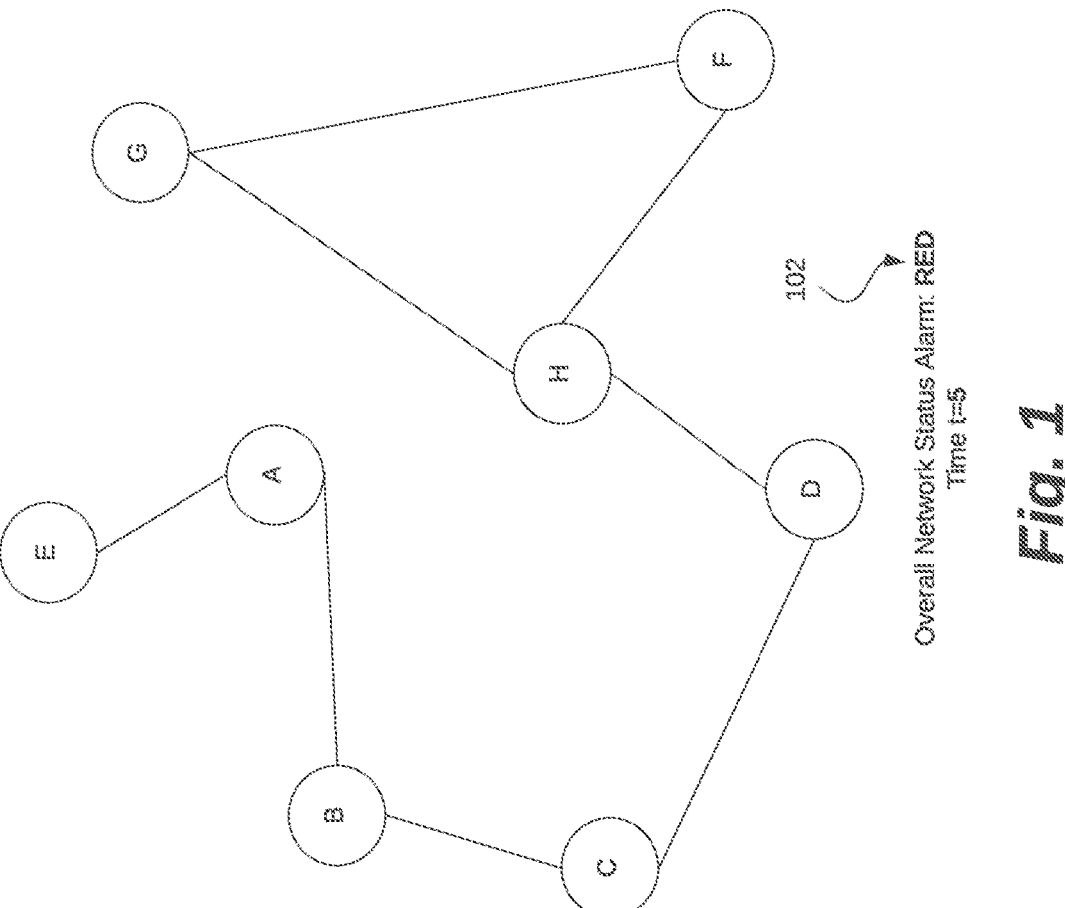
Overall Network Status Alarm: RED
Time t=5
102
*Fig. 1*
100

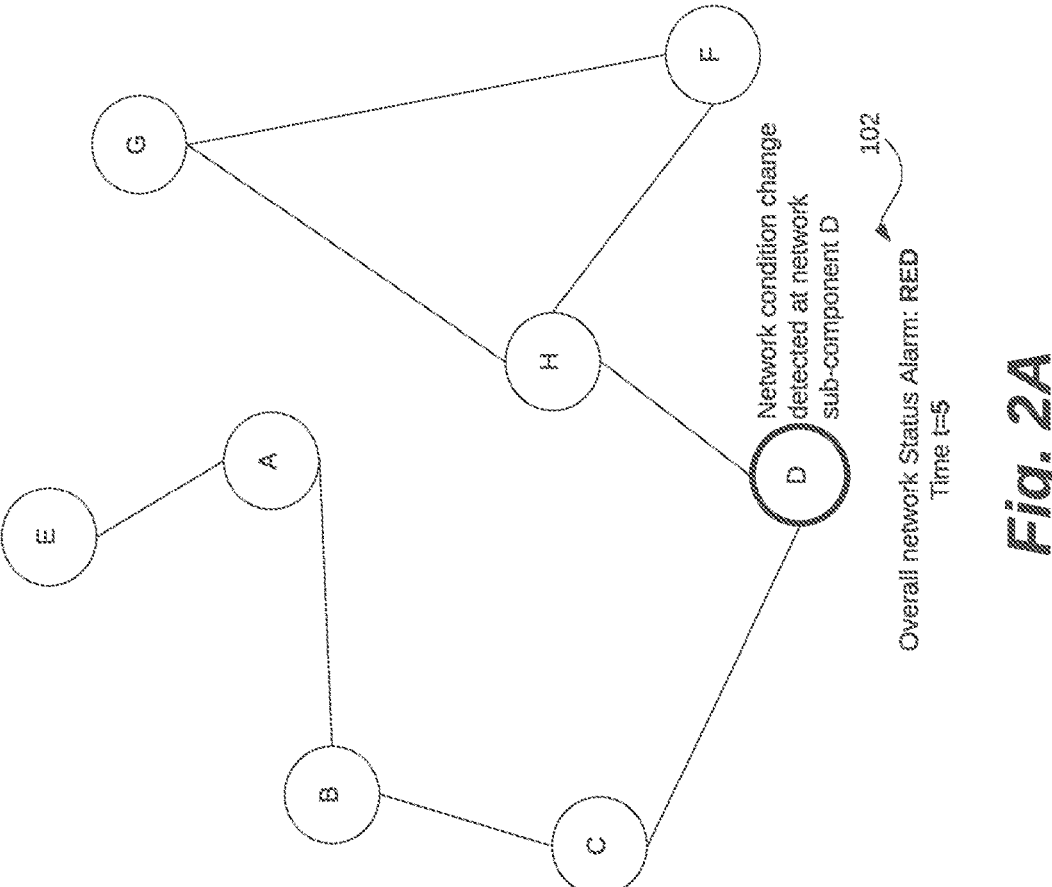
Network condition change detected at network sub-component D
102
Overall network Status Alarm: RED
Time t=5
*Fig. 2A*

Overall network Status: GREEN
Time t=4

Network condition change
detected at network
sub-component C

202

240

242

Network condition change
detected at network
sub-component B

204

202

Overall network Status Alarm: GREEN
Time t=3

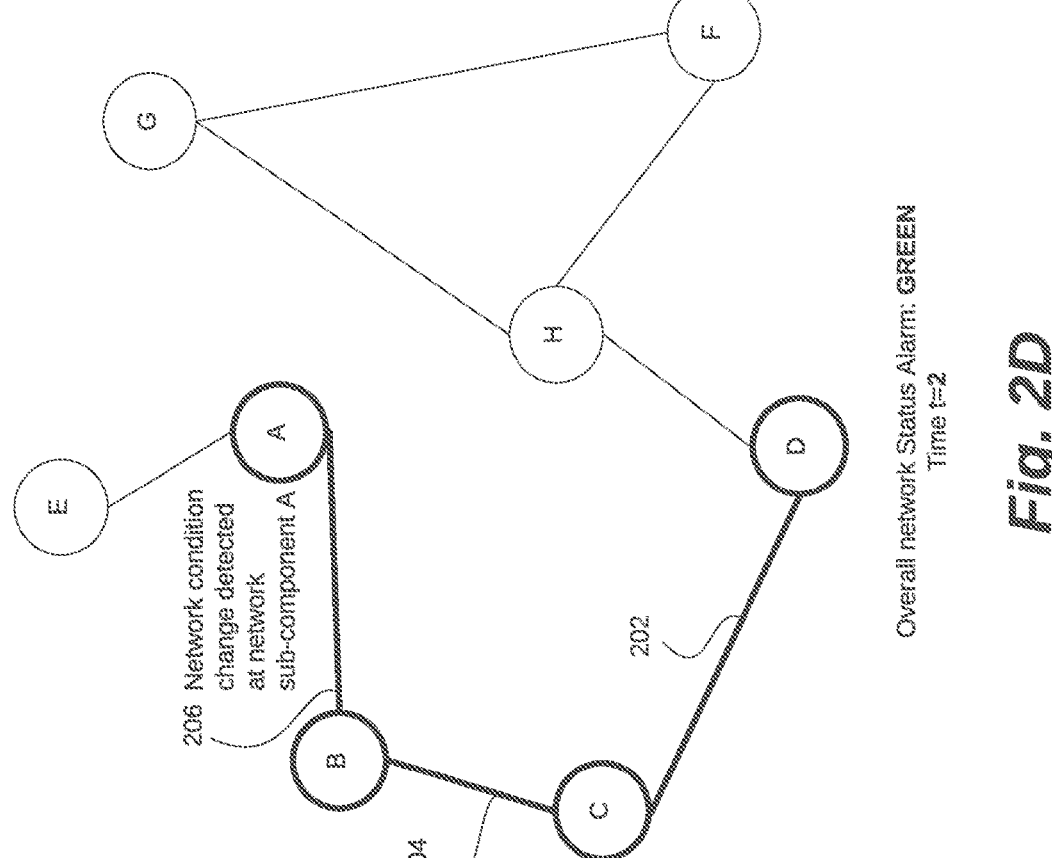
206 Network condition change detected at network sub-component A
204
202
Overall network Status Alarm: GREEN
Time t=2
*Fig. 2D*
244

Overall Network Status Alarm: GREEN
Time t=1
No network condition changes detected

246

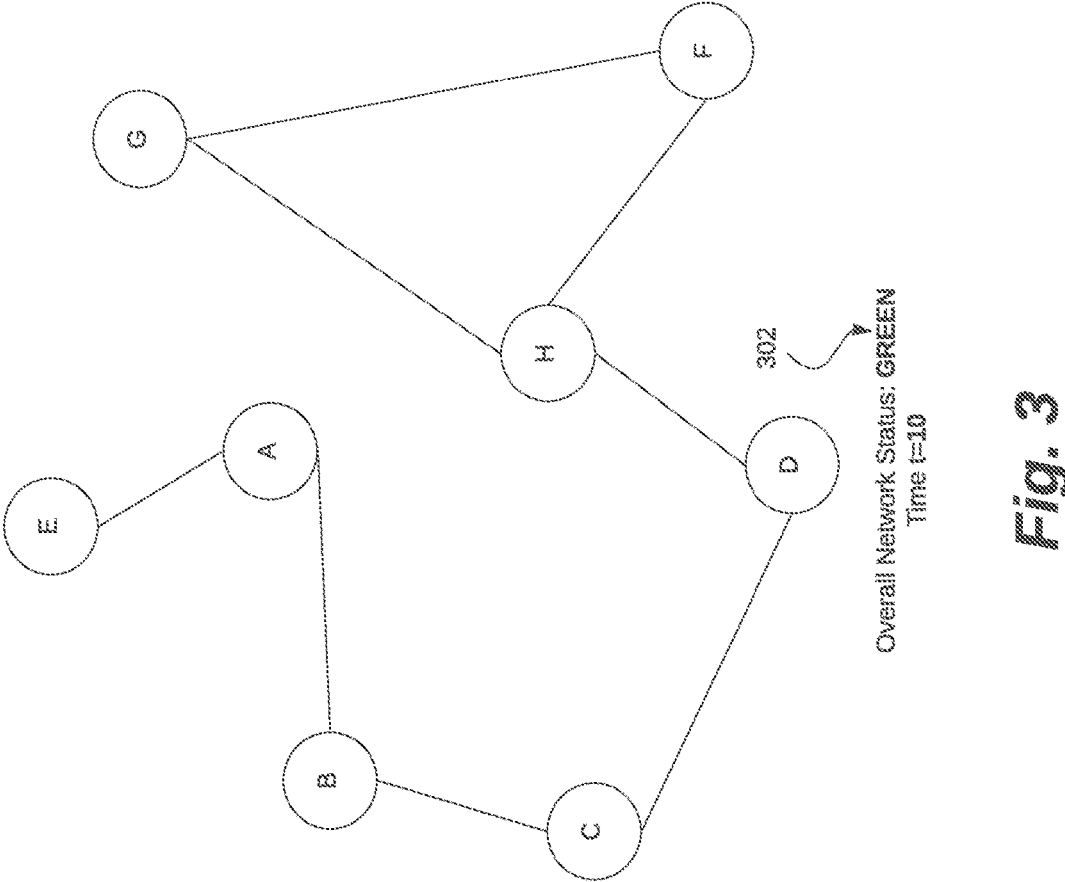
Overall Network Status: GREEN
Time t=10
302
300
*Fig. 3*

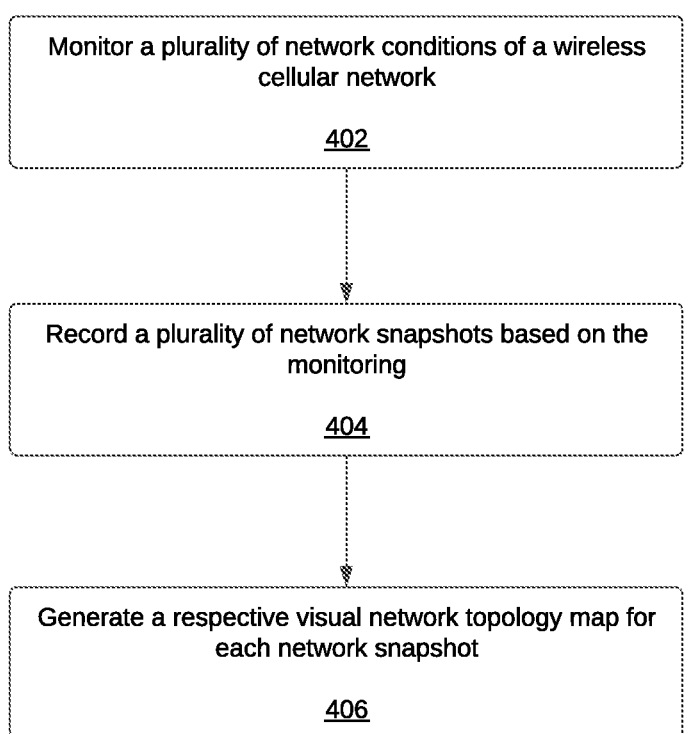
Monitor a plurality of network conditions of a wireless cellular network
402
Record a plurality of network snapshots based on the monitoring
404
Generate a respective visual network topology map for each network snapshot
406
*Fig. 4*

500

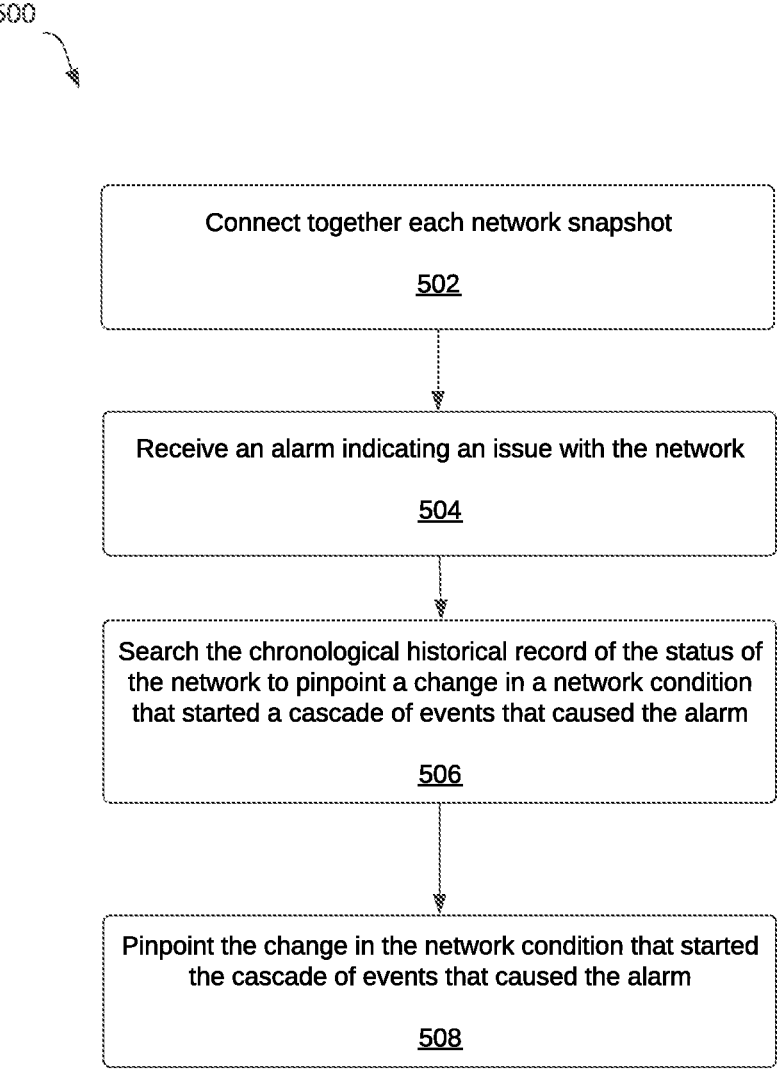

Connect together each network snapshot

502

Receive an alarm indicating an issue with the network

504

Search the chronological historical record of the status of the network to pinpoint a change in a network condition that started a cascade of events that caused the alarm

506

Pinpoint the change in the network condition that started the cascade of events that caused the alarm

Determine how different sub-components in the network
interact with each other

602

Recognizing, based on the determination of how the different
sub-components in the network interact with each other, which
changes in the network were part of a causal chain of events in
the cascade of events that caused the alarm

604

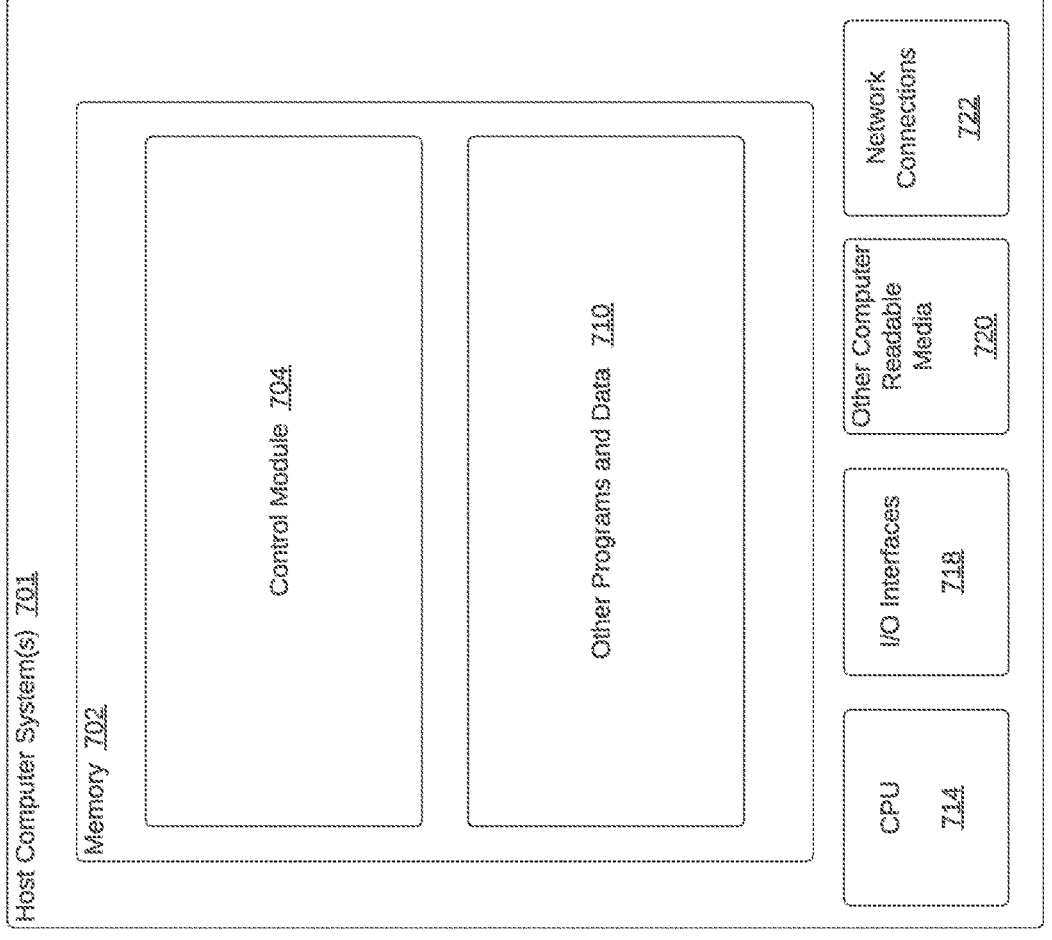
*Fig. 7*

SYSTEMS AND METHODS FOR A VISUAL CHRONOLOGICAL RECORD OF A NETWORK

BRIEF SUMMARY

In Network Operation Centers (NOCs), such as a NOC for a service provider (fifth-generation (5G) wireless cellular network), alarms play an important role in alerting network administrators of any issues or potential issues in the network. However, determining the underlying or root cause of these alarms and performing network management based thereon can be difficult to do in real time. There are several reasons that may contribute to this. With the increasing complexity of networks, it can be difficult to track the source of alarms and identify the root cause or causes. NOCs often receive a large number of alarms, making it difficult for administrators to identify and resolve the root cause of a particular alarm quickly and effectively in real time. For example, the administrator may know when an alarm occurred, but may not know why or what triggered it. In particular, alarms may not provide enough information to identify the root cause, requiring additional investigation and analysis. Also, some alarms can be triggered due to false positives, adding to the challenge of determining the root cause of a problem. Overall, the pressure to resolve alarms and service disruptions quickly in real time in a NOC environment often make it difficult for administrators to thoroughly investigate and determine the root cause of an issue.

To solve the above problem, disclosed herein are systems and methods for a visual chronological record of a network that will help in solving the root cause of the problem. Alarms are a notification symptom and not the cause of issues. In an example embodiment, the system monitors a plurality of relevant network conditions of a network. Over time, the system records a plurality of network snapshots based on the monitoring. Each network snapshot reflects a status of each applicable network condition, including status and active configuration, at a respective point in time at which the snapshot was recorded. The system then generates a respective visual network topology map for each network snapshot through which the status of each network characteristic at the point time at which the snapshot was recorded is accessible. The system connects together each network snapshot resulting in a visual chronological historical record of the status of the network at each point time at which the snapshot was recorded reflected by each respective network topology map. This visual chronological record may then be used (either manually or in an automated manner) to pinpoint a change in a network condition that started a cascade of events that caused the alarm. For example, the system may determine or have knowledge of how different sub-components in the network interact with each other and then recognize, based on this determination, which changes in the network associated with the different network sub-components, and that were indicated in the chronological historical record of the status of the network, were part of a causal chain of events in the cascade of events that caused the alarm.

In an example embodiment, the chronological historical record is chronologically scrollable to view by scrolling along a timeline through different respective network topology maps each associated with a different point in time. Thus, the user may visually scroll through the chronological record and identify changes in network conditions of the particular network sub-components that led up to the network status alarm. In various embodiments, the user may also visually drill down into each network sub-component shown visually in the chronological record to see further chronological detail showing changes in network conditions over time specific to that network sub-component.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 1 illustrates a diagram of a network showing a network status alarm in accordance with embodiments described herein.

FIGS. 2A, 2B, 2C, 2D and 2E illustrate a chronological record of the network of FIG. 1 including respective visual network topology maps of the network for each network snapshot recorded over time reflecting a status of a network condition at a respective point in time at which the snapshot was recorded in accordance with embodiments described herein.

FIG. 3 illustrates a diagram of the network of FIG. 1 showing a network status after an issue with the network that caused the alarm was resolved using the chronological record of the network illustrated in FIGS. 2A through 2E.

FIG. 4 illustrates a logical flow diagram showing one embodiment of a process for generating a visual chronological record of a network in accordance with embodiments described herein.

FIG. 5 illustrates a logical flow diagram showing one embodiment of a process for using the chronological record of a network generated by the process of FIG. 4 for pinpointing the change in the network condition that started the cascade of events which may include a minor notification of degradation of performance metric that caused the alarm, in accordance with embodiments described herein.

FIG. 7 shows a system diagram that describes an example implementation of an underlying computing system for implementing embodiments described herein.

DETAILED DESCRIPTION

Figure 2B:
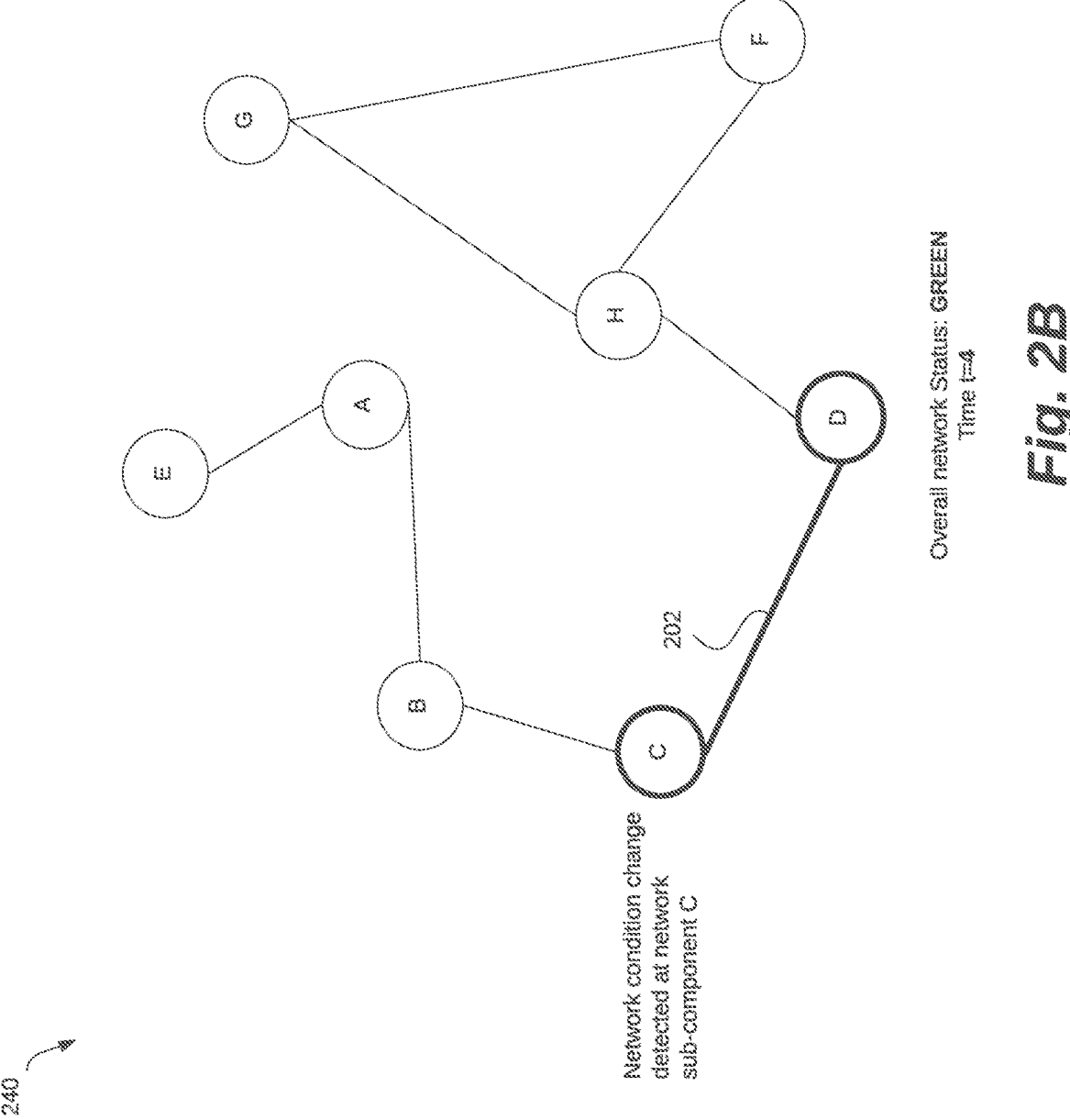

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

FIG. 1 illustrates a diagram of a network 100 showing a network status alarm in accordance with embodiments described herein. In an example embodiment, the network 100 may be a network being monitored by a NOC network 100 shows various example network nodes: A, B, C, D, E, F, G and H. The network nodes may represent various physical, virtual, or logical network components, sub-components or functions.

For example, in a 5G wireless cellular network, the nodes may represent, but are not limited to, one or more or a combination of: 5G network functions (NF); the Core Network (CN), or components thereof (responsible for controlling the communication between the end user and the radio access network); the Radio Access Network (RAN) or components thereof (comprised of base stations and antennas that provide wireless connectivity to end-users); 5G Non-Standalone (NSA) and Standalone (SA) architectures or components thereof (defines the configuration and interworking between the 5G radio access network and an existing LTE network); physical components of a 5G network or components thereof; base stations (gNodeB or eNodeB) or components thereof (responsible for radio transmission and reception, and connecting the devices to the core network); antennas (responsible for radio transmission and reception and coverage); small cells (small and low-powered base stations that are deployed in densely populated areas to enhance coverage and capacity); 5G New Radio (NR) devices (the devices that support 5G, such as smartphones and IoT devices); user equipment (UE); network functions virtualization (NFV) infrastructure or components thereof (the virtualized infrastructure that supports the deployment of 5G network functions); cloud RAN (C-RAN) infrastructure or components thereof (a centralized radio access network architecture that enables the processing of radio signals in the cloud); data centers; network routers; virtual routers; individual servers, individual computers; individual processors; software objects; databases; application programming interfaces (APIs); policy and charging rules and data; operational support system (OSS) data or components; Business support systems (BSS) data or components; software containers; nodes; PODs; clusters; node groups; control planes; software defined data centers (SDDCs); microservices; virtualized environments; software platforms; cloud computing service software or components; network management software or components; network orchestrator software; artificial intelligence (AI) or machine learning (ML) programs, models or modules; user interfaces; operating systems; other network management functions; other NFs; sub-components of any of the aforementioned components; etc.

The lines between the nodes represent physical or logical links between the nodes (e.g., communication paths, relationships or other links). The particular arrangement and number of nodes shown in network 100 is provided as an example and the number, arrangement and types of nodes and the links between them may vary in different embodiments.

In the present example, a network status alarm of RED 102 for network 100 appears in a NOC at time t=5. For example, this may indicate an issue representing a potential problem with the network 100 (or portion of the network) shown in FIG. 1 that occurred or was detected at a particular time represented by time t=5. However, it is not immediately known what triggered the network status alarm of RED 102. For example, network status alarm of RED 102 may indicate that there is a queue of network traffic building up at node D that surpasses some threshold, which caused the network status of RED 102 to be presented. However, it is not immediately known what caused the buildup of the queue. To solve this problem, a visual chronological record of the network 100 may be automatically generated such that the root cause of the network issue that triggered the network status alarm of RED 102 can be identified and addressed.

FIGS. 2A through 2E illustrate a chronological record of the network 100 of FIG. 1 including respective visual network topology maps of the network 100 of FIG. 1 for each network snapshot recorded over time reflecting a status of a network condition at a respective point in time at which the snapshot was recorded in accordance with embodiments described herein. For example, the chronological record of the network 100 illustrated in FIGS. 2A through 2E may have been generated by automatically monitoring relevant network conditions of the nodes of network 100. Over time, the system records a plurality of network snapshots based on the monitoring. Each network snapshot reflects a status of each applicable network condition for each node or link (or a change in such a network condition) at a respective point in time at which the snapshot was recorded. In an example embodiment, the monitoring may be performed by continuously or periodically communicating with the network nodes or applicable network sub-components to obtain status and/or other relevant data.

For example, the network conditions may be indicative of network data points that can potentially change between plurality of network snapshots. The network data points may include, but are not limited to, one or more of: memory consumption; an indication that memory has gone into a failure state; central processing unit (CPU) utilization; data indicative of a container platform not responding; an indication that an interface has failed; an indication that a container network interface (CNI) has failed; an indication that a container storage interface (CNI) has failed; an indication of an Internet Protocol (IP) address mismatch; an indication that a network routing flap has occurred; an indication of a network function (NF) communication link failure; a status of a NF; an indication of an NF failure; an indication of an NF sub-component communication link failure; a status of an NF sub-component; an indication of an NF sub-component failure; a status of a network sub-component; an indication of a network sub-component failure; and an indication of buildup of a queue of network traffic or messages.

The system then generates respective visual network topology maps (examples of which are shown in FIGS. 2A through 2E) for each network snapshot. Through these visual network topology maps, the status of each network characteristic (i.e., network condition) at the point time at which the snapshot was recorded is accessible (e.g., by reading, clicking on or otherwise selecting the applicable node or link in the map). The system connects together each network snapshot resulting in a visual chronological historical record of the status of the network at each point time at which the snapshot was recorded reflected by each respective network topology map (shown in FIGS. 2A through 2E).

In the present example, when the network status alarm of RED 102 was received or otherwise detected by a network administrator or an automated system, the network administrator or automated system may access in real time the visual chronological historical record, shown in FIGS. 2A through 2E to start to scroll back though the record to see what changes occurred in network conditions that may have led up to or causes the alarm. For example, the network administrator or automated system may start with the visual network topology map 238 shown in FIG. 2A.

In particular, FIG. 2A shows a visual network topology map 238 reflecting a status of network conditions at the nodes of the network 100 during a snapshot of the network taken at time t=5 when the alarm occurred. As shown, there was a network condition change at node D detected at time t=5 (e.g., a network condition indicating a queue of network traffic intended for node E building up at node D). This is shown visually on the network topology map 238. As this was the only network condition change at time t=5 when the alarm occurred, the network administrator or an automated system may determine or estimate in real time that this change in network condition caused, contributed to or is otherwise associated with the root cause of the alarm.

The network administrator may then in real time scroll back in the visual chronological historical record to time t=4. Accordingly, FIG. 2B shows a visual network topology map 240 in the visual chronological historical record reflecting a status of network conditions at the nodes of the network 100 during a snapshot of the network taken at time t=4. As shown, there was a network condition change at node C detected at time t=4 (e.g., indicating node C failed or otherwise became non-responsive). As there is a link 202 between node D and node C over which network traffic from node D may need to use to reach node C and there were no other relevant changes in network conditions detected at time t=4, the network administrator or an automated system may determine or estimate in real time that this change in network condition at node C caused, contributed to or is otherwise associated with the network condition indicating a queue of network traffic building up at node D.

Figure 2C:
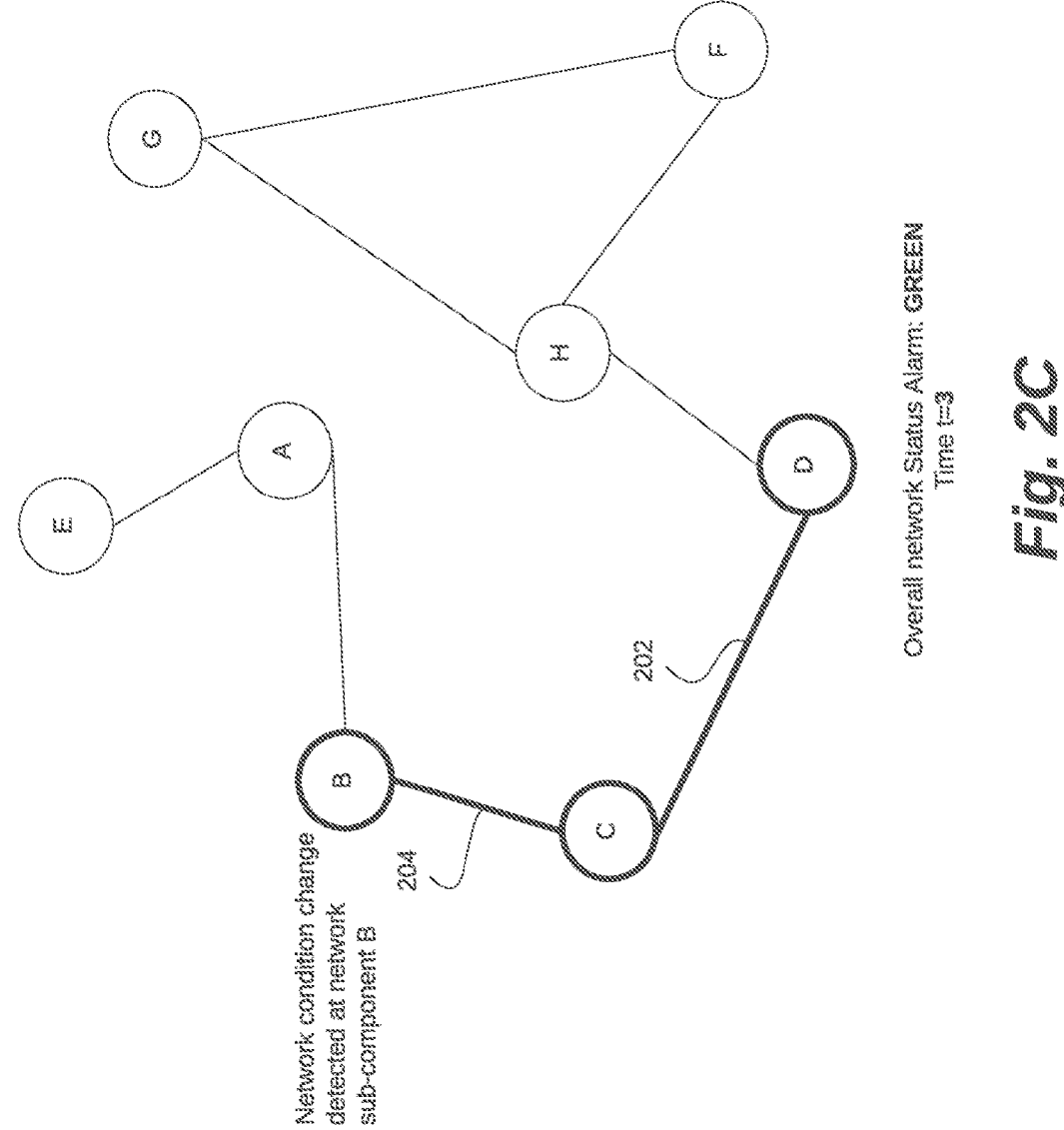

The network administrator may then in real time scroll back in the visual chronological historical record to time t=3. Accordingly, FIG. 2C shows a visual network topology map 242 in the visual chronological historical record reflecting a status of network conditions at the nodes of the network 100 during a snapshot of the network taken at time t=3. As shown, there was a network condition change at node B detected at time t=3 (e.g., indicating node B failed or otherwise became non-responsive). As there is a link 204 between node C and node B over which network traffic from node C may need to use to reach node B and there were no other relevant changes in network conditions detected at time t=3, the network administrator or an automated system may determine or estimate in real time that this change in network condition at node B at time t=3 caused, contributed to or is otherwise associated with the network condition indicating a queue of network traffic intended for node E building up at node D.

The network administrator may then in real time scroll back in the visual chronological historical record to time t=2. Accordingly, FIG. 2D shows a visual network topology map 244 in the visual chronological historical record reflecting a status of network conditions at the nodes of the network 100 during a snapshot of the network taken at time t=2. As shown, there was a network condition change at node A detected at time t=2 (e.g., indicating node A failed or otherwise became non-responsive). As there is a link 206 between node B and node A over which network traffic from node B may need to use to reach node A and there were no other relevant changes in network conditions detected at time t=2, the network administrator or an automated system may determine or estimate in real time that this change in network condition at node A caused, contributed to or is otherwise associated with the network condition indicating a queue of network traffic intended for node E building up at node D.

Figure 2E:
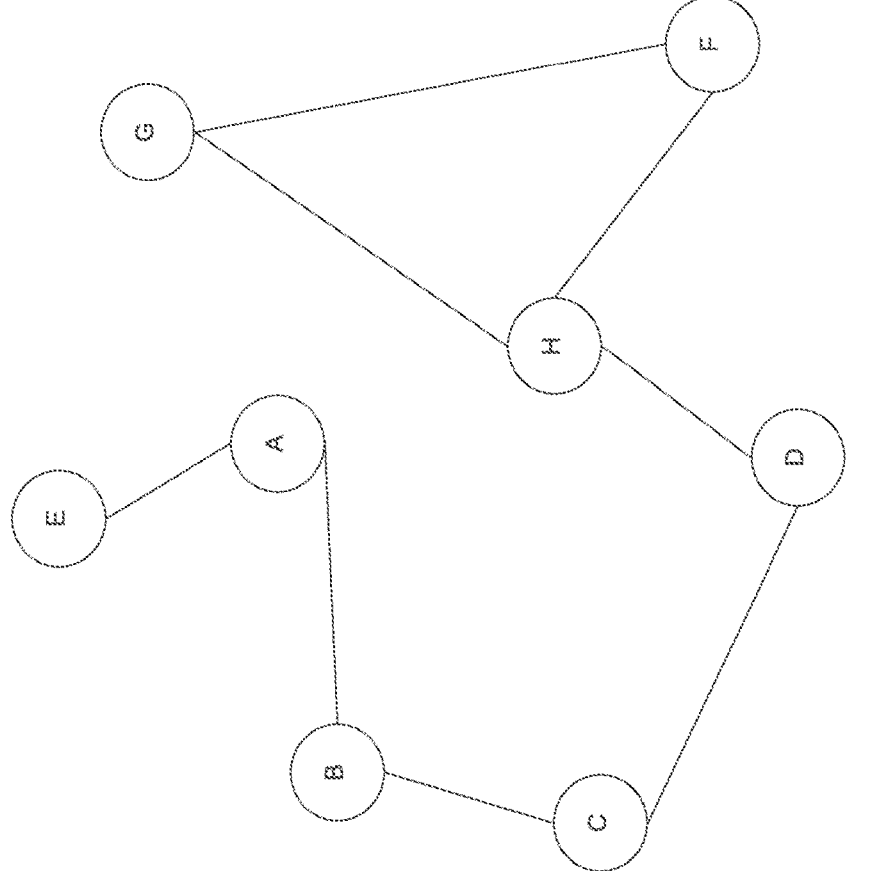

The network administrator may then in real time scroll back in the visual chronological historical record to time t=1. Accordingly, FIG. 2E shows a visual network topology map 246 in the visual chronological historical record reflecting a status of network conditions at the nodes of the network 100 during a snapshot of the network taken at time t=1. As shown, there were no relevant changes in network conditions detected at time t=1. Thus, since node A is the last node before reaching node E in the network 100, the network administrator or an automated system may determine or estimate in real time that the next network change which was detected at node A at time t=2 (e.g., indicating node A failed or otherwise became non-responsive) was the root cause of the network condition indicating a queue of network traffic intended for node E building up at node D that triggered the network status alarm of RED 102 shown in FIG. 2A. Therefore, the system recognizes in real time, based on the determination of how the different nodes (e.g., sub-components) in the network interact with each other, which changes in the network associated with the different network sub-components and indicated in the chronological historical record of the status of the network were part of a causal chain of events in the cascade of events that caused the network status alarm of RED 102.

FIG. 3 illustrates a diagram of the network of FIG. 1 showing a network status after an issue with the network that caused the alarm was resolved using the chronological record of the network illustrated in FIGS. 2A through 2E.

In particular, FIG. 3 shows a visual network topology map 300 reflecting the network status after an issue with the network that caused the alarm was resolved using the chronological record of the network illustrated in FIGS. 2A through 2E. In the present example, after viewing or accessing the visual chronological historical record, shown in FIGS. 2A through 2E, the administrator or an automated system determined that the network change which was detected at node A at time t=2 (e.g., indicating node A failed or otherwise became non-responsive) was the root cause of the network condition indicating a queue of network traffic intended for node E building up at node D that triggered the network status alarm of RED 102 shown in FIG. 2A. In response, the administrator or an automated system then addressed in real time the issue by addressing the problem with node A specifically (e.g., by resetting, restarting or reconfiguring node A) rather than resetting or restarting the entire network 100 shown in FIG. 1 or portion the network 100. Thus, as shown visual network topology map 300 the network status alarm of RED 102 has been cleared and replaced with overall network status alarm of GREEN 302 being displayed.

FIG. 4 illustrates a logical flow diagram showing one embodiment of a process 400 for generating a visual chronological record of a network in accordance with embodiments described herein.

At 402, the system monitors 402 a plurality of network conditions of a wireless cellular network.

At 404, the system, over time, records a plurality of network snapshots based on the monitoring, wherein each network snapshot of the plurality of network snapshots reflects a status of each network condition of the plurality of network conditions at a respective point in time at which the snapshot was recorded.

In an example embodiment, the plurality of network conditions are indicative of network data points that can potentially change between plurality of network snapshots. For example, the network data points may include, but are not limited to, one or more of: memory consumption; an indication that memory has gone into a failure state; central processing unit (CPU) utilization; data indicative of a container platform not responding; an indication that an interface has failed; an indication that a container network interface (CNI) has failed; an indication that a container storage interface (CNI) has failed; an indication of an Internet Protocol (IP) address mismatch; an indication that a network routing flap has occurred; an indication of a network function (NF) communication link failure; a status of a NF; an indication of an NF failure; an indication of an NF sub-component communication link failure; a status of an NF sub-component; an indication of an NF sub-component failure; a status of a network sub-component; an indication of a network sub-component failure; and an indication of buildup of a queue of network traffic or messages.

At 404, the system generates a respective visual network topology map for each network snapshot of the plurality of network snapshots through which the status of each network characteristic of the plurality of network characteristics at the point time at which the snapshot was recorded is accessible. Such network characteristics may include, but are not limited to, network status, location, configuration and interfaces.

FIG. 5 illustrates a logical flow diagram showing one embodiment of a process 500 for using the chronological record of a network generated by the process 400 of FIG. 4 for pinpointing the change in the network condition that started the cascade of events that caused the alarm, in accordance with embodiments described herein.

At 502, the system connects together each network snapshot of the plurality of network snapshots, resulting in a chronological historical record of the status of the network at each point time at which the snapshot was recorded reflected by each respective network topology map. In various example embodiments, the chronological historical record is searchable by date and time and/or network condition or network condition change. The chronological historical record may also be chronologically scrollable to view by scrolling along a timeline through different respective network topology maps each associated with a different point in time point time at which a particular network snapshot of the plurality of network snapshots was recorded.

At 504, the system receives an alarm indicating an issue with the network representing a potential problem in the network.

At 506, the system or an administrator, based on receiving the alarm, searches the chronological historical record of the status of the network to pinpoint a change in a network condition that started a cascade of events that caused the alarm. For example, this may be performed by scrolling along a timeline through different respective network topology maps each associated with a different point in time point time at which a particular network snapshot of the plurality of network snapshots was recorded.

At 508, the system or an administrator pinpoints the change in the network condition that started the cascade of events that caused the alarm.

Figure 6:
FIG. 6 illustrates a logical flow diagram showing one embodiment of a process, useful in the process of FIG. 5, for recognizing which changes in the network were part of a causal chain of events in the cascade of events that caused the alarm, in accordance with embodiments described herein.

FIG. 6 illustrates a logical flow diagram showing one embodiment of a process 600, useful in the process 500 of FIG. 5, for recognizing which changes in the network were part of a causal chain of events in the cascade of events that caused the alarm, in accordance with embodiments described herein.

At 602, the system or an administrator determines how different sub-components in the network interact with each other.

At 604, the system or an administrator recognizes, based on the determination of how the different sub-components in the network interact with each other, which changes in the network associated with the different network sub-components and indicated in the chronological historical record of the status of the network were part of a causal chain of events in the cascade of events that caused the alarm.

An administrator or an automated system may then address a network issue associated with the change in the network condition that started the cascade of events that caused the alarm. An administrator or an automated system may then solve the potential problem in the network by addressing the network issue associated with the change in the network condition that started the cascade of events that caused the alarm.

FIG. 6 Related: Another benefit is cross domain analysis and fast RCA e.g. the issue in networking domain may result in application failure in RAN domain in RAN domain. This visual method aids in quickly identifying the cause or probable cause.

FIG. 7 shows a system diagram that describes an example implementation of an underlying computing system 700 for implementing embodiments described herein.

The functionality described herein for systems and methods for a visual chronological record of a network can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 7 illustrates an example of underlying hardware on which such software and functionality may be hosted and/or implemented.

In particular, shown is example host computer system(s) 701. For example, such computer system(s) 701 may represent one or more of those in various NOCs, data centers, base stations and cell sites that are, or that host or implement the functions of: routers, components, microservices, PODs, containers, nodes, node groups, control planes, clusters, virtual machines, NFs, and other aspects or components for a visual chronological record of a network. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random access memory (RAM), various types of read-only memory (ROM), neural networks, other computer-readable storage media (also referred to as pro-cessor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein for systems and methods for a visual chronological record of a network. Memory 702 may also store other programs and data 710, which may include rules, databases, application programming interfaces (APIs), OSS data, BSS data, software containers, nodes, PODs, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include location data interfaces, sensor data interfaces, interfaces, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
at least one memory that stores computer instructions; and
at least one processor that executes the computer instructions to perform actions, the actions including:

monitoring a plurality of network conditions of a wireless cellular network;

over time, recording a plurality of network snapshots based on the monitoring, wherein each network snapshot of the plurality of network snapshots reflects a status of each network condition of the plurality of network conditions at a respective point in time at which the snapshot was recorded;

generating a respective visual network topology map for each network snapshot of the plurality of network snapshots through which the status of each network characteristic of the plurality of network characteristics including network status, location, configuration and interfaces, at the point in time at which the snapshot was recorded is accessible;

connecting together each network snapshot of the plurality of network snapshots resulting in a chronological historical record of the status of the network at each point time at which the snapshot was recorded reflected by each respective network topology map;

receiving an alarm indicating an issue with the network or supported service representing a potential problem in the network;

based on receiving the alarm, searching the chronological historical record of the status of the network to pinpoint a change in a network condition that started a cascade of events that caused the alarm; and pinpointing the change in the network condition that started the cascade of events that caused the alarm, wherein the pinpointing the change in the network condition that started the cascade of events that caused the alarm includes:

determining how different sub-components in the network interact with each other; and recognizing, based on the determination of how the different sub-components in the network interact with each other, which changes in the network associated with the different network sub-components and indicated in the chronological historical record of the status of the network were part of a causal chain of events in the cascade of events that caused the alarm.

2. The system of claim 1 wherein the chronological historical record is searchable by date and time, locations.

3. The system of claim 1 wherein the chronological historical record is searchable by network condition or network condition change.

4. The system of claim 1 wherein the chronological historical record is chronologically scrollable to view by scrolling along a timeline through different respective network topology maps each associated with a different point in time point time at which a particular network snapshot of the plurality of network snapshots was recorded.

5. The system of claim 1, wherein the actions further comprise:
addressing a network issue associated with the change in the network condition that started the cascade of events that caused the alarm; and
solving the potential problem in the network by addressing the network issue associated with the change in the network condition that started the cascade of events that caused the alarm.

6. The system of claim 1 wherein the plurality of network conditions are indicative of network data points that can potentially change between plurality of network snapshots.

7. The system of claim 6 wherein the network data points include one or more of:

memory consumption; an indication that memory has gone into a failure state; central processing unit (CPU) utilization; data indicative of a container platform not responding; an indication that an interface has failed; an indication that a container network interface (CNI) has failed; an indication that a container storage interface (CNI) has failed; an indication of an Internet Protocol (IP) address mismatch; an indication that a network routing flap has occurred; an indication of a network function (NF) communication link failure; a status of a NF; an indication of an NF failure; an indication of an NF sub-component communication link failure; a status of an NF sub-component; an indication of an NF sub-component failure; a status of a network sub-component; an indication of a network sub-component failure; and an indication of buildup of a queue of network traffic or messages.

8. A method comprising:

monitoring a plurality of network conditions of a wireless cellular network;

over time, recording a plurality of network snapshots based on the monitoring, wherein each network snapshot of the plurality of network snapshots reflects a status of each network condition of the plurality of network conditions at a respective point in time at which the snapshot was recorded;

generating a respective visual network topology map for each network snapshot of the plurality of network snapshots through which the status of each network characteristic of the plurality of network characteristics at the point time at which the snapshot was recorded is accessible;

connecting together each network snapshot of the plurality of network snapshots resulting in a chronological historical record of the status of the network at each point time at which the snapshot was recorded reflected by each respective network topology map;

receiving an alarm indicating an issue with the network or supported service representing a potential problem in the network;

based on receiving the alarm, searching the chronological historical record of the status of the network to pinpoint a change in a network condition that started a cascade of events that caused the alarm; and pinpointing the change in the network condition that started the cascade of events that caused the alarm, wherein the pinpointing the change in the network condition that started the cascade of events that caused the alarm includes:

determining how different sub-components in the network interact with each other; and recognizing, based on the determination of how the different sub-components in the network interact with each other, which changes in the network associated with the different network sub-components and indicated in the chronological historical record of the status of the network were part of a causal chain of events in the cascade of events that caused the alarm.

9. The method of claim 8 wherein the chronological historical record is searchable by date and time.

10. The method of claim 8 wherein the chronological historical record is searchable by network condition or network condition change.

11. The system of claim 8 wherein the chronological historical record is chronologically scrollable to view by scrolling along a timeline through different respective network topology maps each associated with a different point in time point time at which a particular network snapshot of the plurality of network snapshots was recorded.

12. A non-transitory computer-readable storage medium having computer-executable instructions stored thereon that, when executed by at least one computer processor, cause actions to be performed including:

monitoring a plurality of network conditions of a wireless cellular network;

over time, recording a plurality of network snapshots based on the monitoring, wherein each network snapshot of the plurality of network snapshots reflects a status of each network condition of the plurality of network conditions at a respective point in time at which the snapshot was recorded;

generating a respective visual network topology map for each network snapshot of the plurality of network snapshots through which the status of each network characteristic of the plurality of network characteristics at the point time at which the snapshot was recorded is accessible;

connecting together each network snapshot of the plurality of network snapshots resulting in a chronological historical record of the status of the network at each point time at which the snapshot was recorded reflected by each respective network topology map;

receiving an alarm indicating an issue with the network or supported service representing a potential problem in the network;

based on receiving the alarm, searching the chronological historical record of the status of the network to pinpoint a change in a network condition that started a cascade of events that caused the alarm; and pinpointing the change in the network condition that started the cascade of events that caused the alarm, wherein the pinpointing the change in the network condition that started the cascade of events that caused the alarm includes:

determining how different sub-components in the network interact with each other; and recognizing, based on the determination of how the different sub-components in the network interact with each other, which changes in the network associated with the different network sub-components and indicated in the chronological historical record of the status of the network were part of a causal chain of events in the cascade of events that caused the alarm.

13. The non-transitory computer-readable storage medium of claim 12 wherein the chronological historical record is searchable by date and time.

14. The non-transitory computer-readable storage medium of claim 12 wherein the chronological historical record is searchable by network condition or network condition change.

15. The non-transitory computer-readable storage medium of claim 12 wherein the chronological historical record is chronologically scrollable to view by scrolling along a timeline through different respective network topology maps each associated with a different point in time point time at which a particular network snapshot of the plurality of network snapshots was recorded.

* * * * *